(12) United States Patent
Kariniemi (10) Patent No.: US 10,899,184 B2
(45) Date of Patent: Jan. 26, 2021

(54) TRAILING ARMS FOR A VEHICLE (71) Applicant: Stephen Kariniemi, Scottsdale, AZ (US)

(72) Inventor: Stephen Kariniemi, Scottsdale, AZ (US)

(73) Assignee: Stephen Kariniemi, Scottsdale, AZ (US)

( * ) Notice: Subject to any disclaimer, the term of this patent is extended or adjusted under 35 U.S.C. 154(b) by 81 days.

(21) Appl. No.: 16/231,471

(22) Filed: Dec. 22, 2018

(65) Prior Publication Data

US 2020/0198424 A1 Jun. 25, 2020

(51) Int. Cl.
*B60G 3/20* (2006.01)
*B60G 7/00* (2006.01)
*B62D 21/18* (2006.01)

(52) U.S. Cl.
CPC ............... *B60G 3/20* (2013.01); *B60G 7/001* (2013.01); *B62D 21/183* (2013.01); *B60G 2204/143* (2013.01); *B60G 2204/148* (2013.01); *B60G 2300/07* (2013.01)

(58) Field of Classification Search
CPC .... B60G 3/20; B60G 7/001; B60G 2204/143; B60G 2300/07; B60G 2204/148; B62D 21/183
See application file for complete search history.

(56) References Cited

U.S. PATENT DOCUMENTS

| | | | | |
|---|---|---|---|---|
| 5,507,510 A * | 4/1996 | Kami | ...................... | B60G 3/26 280/124.136 |
| 5,697,633 A * | 12/1997 | Lee | ......................... | B60G 3/26 280/124.136 |
| 2014/0090935 A1* | 4/2014 | Pongo | ...................... | B62K 5/01 188/18 A |
| 2015/0202937 A1* | 7/2015 | Hintzen | ................... | B60G 3/14 280/124.133 |
| 2016/0347137 A1* | 12/2016 | Despres-Nadeau | .... | B60G 7/005 |
| 2017/0096174 A1* | 4/2017 | Kariniemi | ............. | B60G 11/04 |
| 2018/0072349 A1* | 3/2018 | Hisada | ................ | B62D 23/005 |
| 2019/0299734 A1* | 10/2019 | Hisamura | ................ | B60G 3/04 |
| 2019/0299736 A1* | 10/2019 | Hisamura | ................ | B60G 3/14 |
| 2019/0351704 A1* | 11/2019 | Nishiguchi | ........... | B60B 27/065 |
| 2020/0025275 A1* | 1/2020 | Schroeder | ............... | F16D 3/841 |
| 2020/0130450 A1* | 4/2020 | Nakashima | .......... | B60G 15/068 |

* cited by examiner

*Primary Examiner* — Darlene P Condra
(74) *Attorney, Agent, or Firm* — Ryan D Kariniemi (57) ABSTRACT

An All-Terrain Vehicle with a frame, a rear axle and at least a rear trailing arm. The rear trailing arm may attach to the vehicle frame frontward of the rear axle and may enter a wheel hub space frontwards of the rear axle and attach to an inset wheel hub. The rear trailing arm may attach to the wheel hub rearward of the rear axle. The trailing arm provides clearance when the wheel hub is moved vertically by an angle of 27 degrees. The trailing arm may have multiple individual pieces or be one unibody and have different portions connecting to the wheel hub, for example, some portions frontward of a wheel hub center axis and other portions rearward of the wheel hub center axis.

5 Claims, 6 Drawing Sheets

TRAILING ARMS FOR A VEHICLE

FIELD OF THE INVENTION

The present invention generally relates to wheeled vehicles, and more specifically to all-terrain vehicles.

The present application incorporates entire contents by reference, U.S. Pat. No. 9,493,191 to Kariniemi filed Apr. 10, 2014, entitled "Arcuate Frame For A Vehicle" and U.S. Pat. No. 10,023,234 to Kariniemi, filed Dec. 20, 2016, entitled "An Arcuate Frame For A Vehicle".

BACKGROUND OF THE INVENTION

All-terrain vehicles (hereinafter "ATV") typically have a shorter wheelbase which gives the ATV increased maneuverability over longer wheelbased ATVs such as sandrails, desert trucks, and dune buggies. The shorter wheelbase however can have shortcomings compared to a longer wheelbase, for example, a shorter wheel base can have a rougher ride due in at least part to having shocks with less travel. In some cases, it remains advantageous to lengthen an axle to allow for more movement or travel. For example, if an axle can move 27 degrees in an up and down motion, a longer axle allows for more travel. In some cases, keeping width of the ATV at a specific dimension is advantageous. So, in order to increase travel, a longer axle is utilized by moving axle connection point (e.g. wheel hub), inset to a mating wheel, further to outside of the ATV. In order to provide proper clearance of trailing arms in this condition, it remains desirable to have improvements to the trailing arms.

SUMMARY OF THE INVENTION

It has been recognized that it would be advantageous to develop an ATV with increased manuevarability and increased travel. In one embodiment, an ATV has a frame (e.g., an arcuate frame according to U.S. Pat. No. 9,493,191 to Kariniemi or U.S. Pat. No. 10,023,234 to Kariniemi, with trailing arms as described herein attached to the frame. The trailing arms have a first portion that may be substantially straight and a second portion that is angled (or at an angle) from the first portion and attached to an inset wheel hub. The trailing arms enter wheel hub space frontward (in some examples the trailing arms may enter rearward of the rear axle as the rear axle enters the wheel hub space) of a rear axle, as the rear axle enters the wheel hub space, and some portion of at least some of the trailing arms cross the rear axle (with in the wheel hub space) to rearward side (in some examples cross to the frontward side) of rear axle near attachment point to the wheel hub (while ensuring clearance between axle and trailing arm when wheel is moved vertically up to 27 degrees from original axle location). Trailing arms made and used in accordance with this disclosure, enable use of trailing arms for inset wheel hubs that attach to a frame portion frontward (in some examples may be rearward) of the rear axle and provide clearance when the wheel is raised or lowered up to 27 degrees.

Additional features and advantages of the invention will be apparent from the description which follows, taken in conjunction with accompanying drawings, which together illustrate, by way of example, features of the invention.

DETAILED DESCRIPTION

Reference will now be made to some embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A vehicle with trailing arms in accordance with various embodiments are disclosed herein and examples are illustrated in the Figures. The trailing arms may have an arcuate shape and may be attached to an arcuate frame. For example, the trailing arms may be constructed from a structural component or member, e.g., a truss or joist made out of a tubular-shaped steel alloy, or a steel or aluminum plate, or any rigid or semi-rigid material or cross sectional shape. For example, the trailing arms may be made out of a rod. The trailing arms may be individual pieces, for example 4 individual pieces. In some embodiments, some of the individual pieces may be connected to each other by a structural member such as a rod or a plate or the trailing arms may be made out of a single plate. In some embodiments the trailing arms are all connected by a rod or plate. In an alternative embodiment, the trailing arms may be made out of a plate with sections of the plate removed. The structural component (e.g., trailing arm) may have a tubular construction typically ranging from approximately 0.5 inches to 3 inches in diameter or whatever diameter is required for adequate strength. The trailing arms can be shaped to accommodate more wheel travel. The trailing arms may be attached at the frame or to a plate 151 that is attached to the frame on one end and attached to a wheel hub at opposing end. The trailing arms may have an arcuate shape or bend or change in direction to help accommodate more wheel travel.

Figure 1:
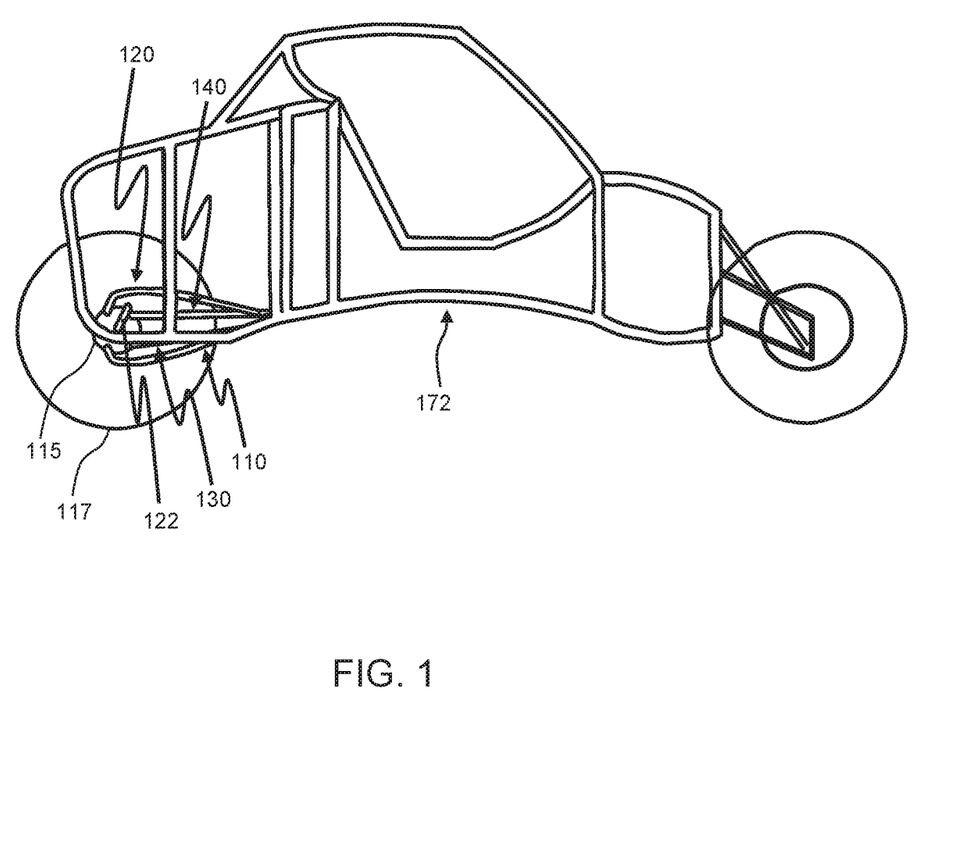
FIG. 1 shows a side view of a vehicle with trailing arms in accordance with an embodiment.

In an embodiment, as shown in FIG. 1, the ATV may have a longitudinal arcuate shape 172, The trailing arms, for example an inward bottom trailing arm 110, may have a first portion of the inward bottom trailing arm 110 that has an arcuate shape that extends the longitudinal arcuate shape of the frame 172, for example the first portion may extend or angle downward, or the first portion may be substantially straight and angle downward from the attachment point on the frame. The inward bottom trailing portion may have a second portion extending from the first portion and angling outward towards the wheel hub 115 and attaching rearward and downward of the rear axle 122. An inward top trailing arm 120 may have a first portion that has an arcuate shape, or the first portion may be straight, and the first portion may angle in an upward direction from an attachment point on the frame. The inward top trailing arm 120 may have a second portion, that extends from the first portion, and angling outward toward the wheel hub 115 and attaching to the wheel hub 115 upward and rearward of the rear axle 122. An outward bottom trailing arm 130 may have a first portion that extends in a downward direction from the frame, or a plate attached to the frame, and a second portion that angles out towards the wheel hub 115 and attaches to the wheel hub 115 downward and frontward of the rear axle 122. An outward top trailing arm 140 may have a first portion that extends in an upward direction from the frame, and a second portion, extending from the first portion, angling outward towards the wheel hub 115 and attaching to the wheel hub 115 upwards and forwards of the rear axle 122.

Figure 2:
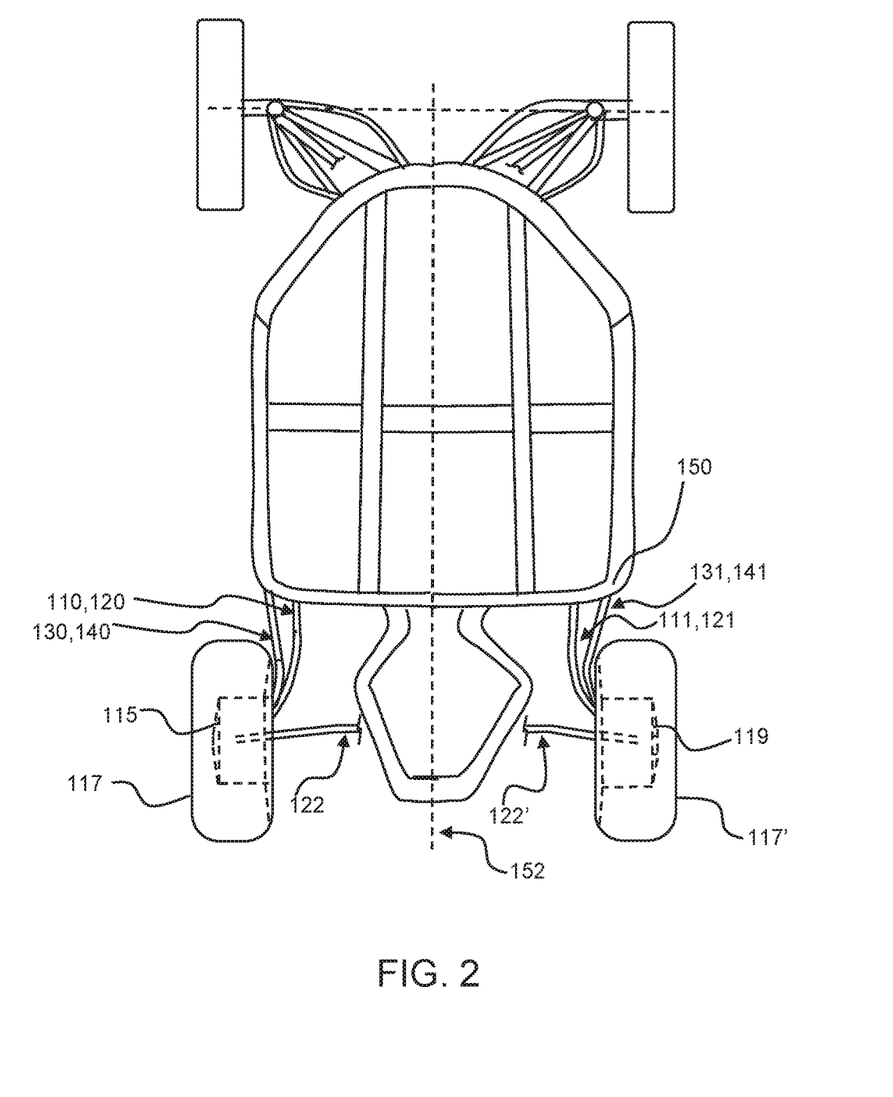
FIG. 2 is a top view of a vehicle frame with trailing arms in accordance with an embodiment.

In one embodiment, as shown in FIG. 2, the inward trailing arms 110, 120 and 111,121 attach to a point on the frame 150 and to a point on the respective wheel hubs 115,119 rearward of rear axle 122,123 respectively (not shown in FIG. 2). In one embodiment the wheel hubs 115,119 are inset into wheels, 117, 118 about 9 inches, or about % or even ⅞ of wheel width. The wheel width in one example is approximately 12 inches wide. Often it is desired to be inset a maximum that wheel allows. In some examples, the hubs may be inset about ⅛, X or % of wheel width. In some examples, the wheel hub may be inset 1 inch, 2 inches, 3 inches, 4 inches, 5 inches, 6 inches, 7 inches, 8 inches, 10 inches, or 12 inches or more. The drivers side outward trailing arms 130,140 and passenger side trailing arms 131, 141 attach to a point on the frame 150 outward of the drivers side inward trailing arms 110, 120 and passenger side inward trailing arms 111, 121 respectively and to a point on the respective wheel hubs 115,119 frontward of rear axle 122, 123 respectively.

Figure 3:
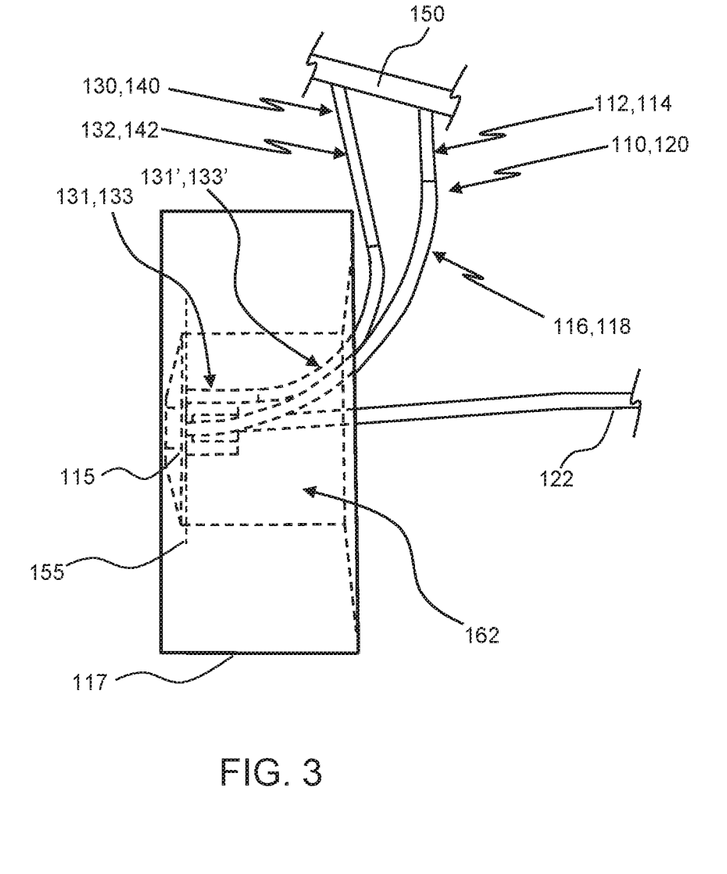
FIG. 3 is a partial top view of a frame with trailing arms in accordance with an embodiment.

As shown in FIG. 3, by example, drivers side inward trailing arms 110,120 may have a first portion 112,114 that extends (inward or outward or inline to longitudinal line 152) from the frame 150 and a second portion 116,118 that extend outward and attaches to the wheel hub 115 rearward of rear axle 122. Trailing arms 130,140, and 110, 120 attach to the frame 150 and angle outward towards the wheel hub 115 and enter the wheel space 162 frontward of the rear axle 122. The outer trailing arms 130,140 attach to the wheel hub 115 frontward of the axle 122 and the inner trailing arms 110,120 may attach to the wheel hub 115 rearward of the rear axle 122. In some cases the inner trailing arms 110,120 may attach to the wheel hub substantially inline with the rear axle 122 or in other cases may attach slightly frontward of the rear axle 122. The first portion may not extend inward, in some cases it may extend inline with a longitudinal line 152 (FIG. 2) or may extend outward. In another example, the trailing arms 110,120 may have a third portion 116', 118' connecting the first portion 112,114 to the second portion 116,118. The first portion and second portion may be substantially straight and connected by an arcuate or curved portion. In other embodiments, the arcuate or curved portion may make up the second portion. Also shown in FIG. 3 by way of example, drivers side outward trailing arms 130,140 may have a first portion 132,142 that extends (inward, outward, or inline to longitudinal line 152) from the frame 150 and a second portion 131,133 that extend outward and attaches to the wheel hub 115 frontward of rear axle 122. By way of example, outward trailing arms 130, 140 may have a third portion 131', 133' connecting the first portion 132,142 to the second portion 131,133. The inward trailing arms 110 and 120 and outward trailing arms 130 and 140 may be substantially inline respectively, from a top view as shown in FIG. 3. In other embodiments, the trailing arms may not be in line. The inner trailing arms 110,120 enter the wheel space 162 frontward of the rear axle 122 and cross the rear axle 122 less than an inch from the wheel hub 115 in some examples. In other examples the inner trailing arms 110, 120 may cross the rear axle about 1 inch, 2 inches, 3 inches, 4 inches or more from the wheel hub, but it can be advantageous to attach to the wheel hub 115 rearward of the rear axle 122 but still maintain clearance when the wheel is raised or dropped, for example, by 27 degrees. The inner trailing arms 110, 120 cross the rear axle as shown in FIG. 3 from a top view and attach as far rearward as possible in some cases to have a more stable trailing arm but balance strength with clearance of the rear axle 122 when the wheel is raised or lowered.

Figure 4:
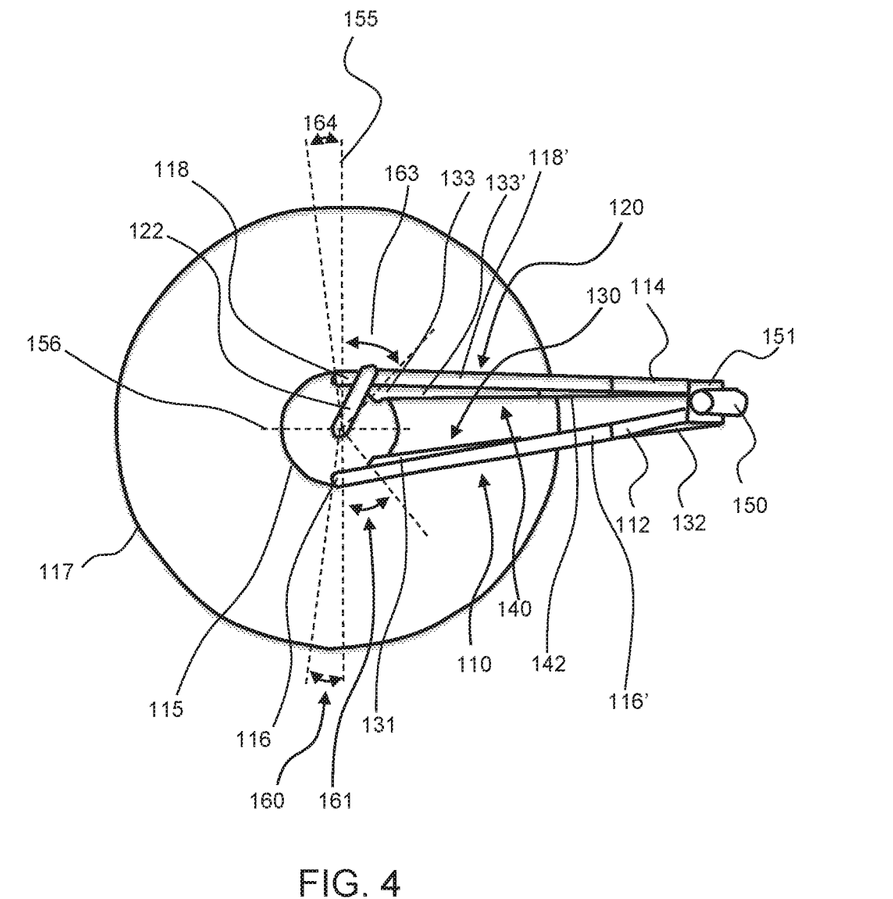
FIG. 4 is a partial side view of a vehicle with trailing arms in accordance with an embodiment.

FIG. 4 shows, by way of example, a side view of a drivers side wheel, from inside to outside of vehicle. Drivers side lower inner trailing arm 110 has a first portion 112 and a second portion 116. In one example, as shown in FIG. 4, the drivers side inner lower trailing arm 110 also has a third portion 116' connecting the first portion 112 and the second portion 116. The drivers side inner lower trailing arm 110 may angle downward from frame 150 along first portion 112 and the second portion 116 may also continue angling downward. The second portion 116 angles outward towards the wheel hub 115 and attaches to the wheel hub 115 rearward of wheel hub center axis, or mostly rearward, and at an angle between 1 degree and 45 degrees clockwise from the center point of the wheel hub and downward of a horizontal line 156 going through the center point of the wheel hub and rearward of a vertical line 155 going through a center point of the wheel hub 115. In one example, the second portion 116 attaches to the wheel hub 15 degrees clockwise (as indicated by angle 160) from center point of wheel hub 115 (vertical wheel hub line 155 and horizontal wheel hub line 156 intersection), and rearward of vertical wheel hub line 155. The second portion 116 may attach along an outer periphery of the wheel hub 115 as shown in FIG. 4. In other examples, the second portion 116 may connect to the wheel hub at a location of 1 degree, 5 degrees, 10 degrees, 20 degrees, 30 degrees, 35 degrees or 40 degrees or more as indicated by angle 160 at a radial distance of 3.5 inches from center of hub. In other examples, the radial distance may be different, for example 2 inches, 2.5 inches, 3 inches, 4 inches, 4.5 inches, 5 inches, or 6 inches or more.

FIG. 4 shows, by way of example, a drivers side inner upper trailing arm 120 has a first portion 114 and a second portion 118. In one example, the drivers side inner upper trailing arm 120 also has a third portion 118' connecting the first portion 114 and the second portion 118. The drivers side inner upper trailing arm 120 may angle upward from frame 150 along first portion 114 and the second portion 118 may also continue angling upward. The second portion 118 angles outward towards the wheel hub 115 and attaches to the wheel hub 115 rearward, or mostly rearward, of wheel hub center axis and at an angle between 1 and 45 degrees counter clockwise from a center point of the wheel hub 115 and above a horizontal line 156 going through the center point of the wheel hub 115 and rearward of a vertical line 155 going through the center point of the wheel hub 115. In one example, the second portion 118 attaches to the wheel hub 15 degrees counter clockwise (as indicated by angle 164) from center point of wheel hub 115 (vertical wheel hub line 155 and horizontal wheel hub line 156 intersection) and rearward of vertical wheel hub line 155 and at a radial distance of 3.5 inches from center of the hub. The second portion 118 may attach along an outer periphery of the wheel hub 115 as shown in FIG. 4. In other examples, the second portion 118 may connect to the wheel hub at a location of 1 degree, 5 degrees, 10 degrees, 20 degrees, 30 degrees, or 40 degrees or more, as indicated by angle 164 at a radial distance of 2 inches, 2.5 inches, 3 inches, 4 inches, 4.5 inches, 5 inches, 5.5 inches, or 6 inches or more.

Figure 5:
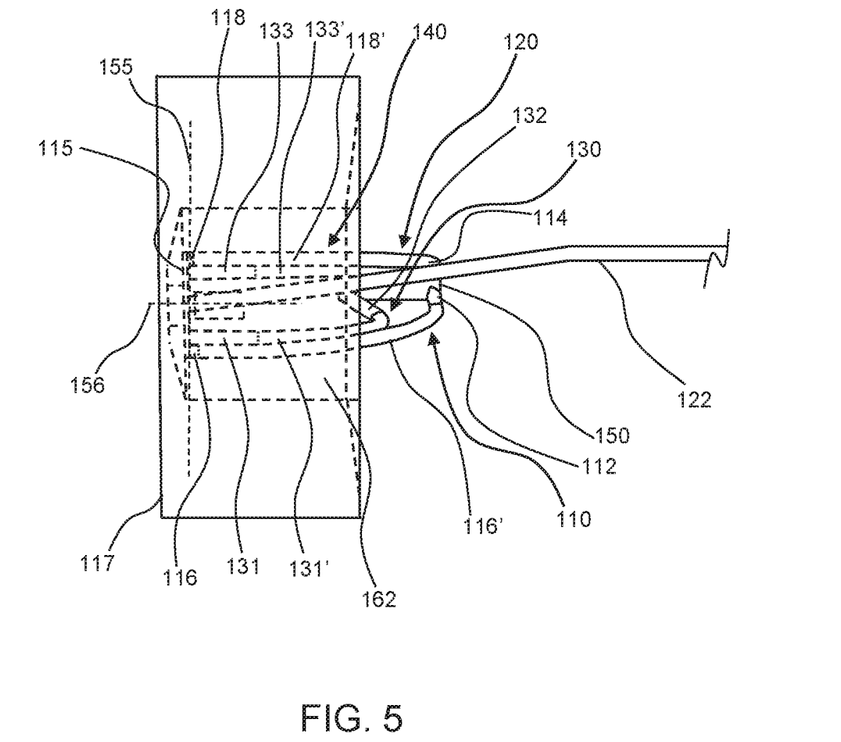
FIG. 5 is a partial rear view of a vehicle with trailing arms in accordance with an embodiment.

FIG. 4 shows, by way of example, a side view from inside to outside of vehicle. Drivers side outer lower trailing arm 130 has a first portion 132 and a second portion 131. In one example, the drivers side outer lower trailing arm 130 may have a third portion 131' (connecting the first portion 132 and the second portion 131 as shown in FIG. 5). In other examples, the second portion 131 may connect directly to the first portion 132, for example the second portion may have a straight portion and a curved portion. In other examples, the first portion 132 may have a straight portion and a curved portion and connect directly to the second portion 131. The drivers side outer lower trailing arm 130 may angle downward (as shown in FIG. 4), or it may substantially go parallel to ground, from frame 150 along first portion 132 and the second portion 131. The second portion 131 may angle outward towards the wheel hub 115 and attach to the wheel hub 115 frontward, or mostly frontward, of wheel hub 115 center axis and at an angle between 10 and 60 degrees counter clock wise from a center point of the wheel hub 115 and below a horizontal line 156 going through the center point of the wheel hub 115 and frontward of a vertical line 155 going through a center point of the wheel hub 115. In one example, the second portion 131 attaches to the wheel hub 45 degrees counter clockwise from center point of intersection of vertical wheel hub line 155 and horizontal wheel hub line 156 (as indicated by angle 161) and frontward of vertical wheel hub line 155 at a radial distance of 3.5 inches. The second portion 131 may attach along an outer periphery of the wheel hub 115 as shown in FIG. 4 In other examples, the second portion 131 may connect to the wheel hub 115 at a location of 10 degrees, 20 degrees, or 30 degrees, 40 degrees, 50 degrees, 55 degrees or more as indicated by angle 161. In some examples, the trailing arm attaches to hub at a radial distance of 3.5 inches from center of hub. In other examples, it may be 2 inches, 2.5 inches, 3 inches, 4 inches, 5 inches, 6 inches or more.

FIG. 4 shows, by way of example, a side view from inside to outside of vehicle. Drivers side outer upper trailing arm 140 has a first portion 142 and a second portion 133. In one example, the drivers side outer upper trailing arm 140 may have a third portion 133' (connecting the first portion 142 and the second portion 133 as shown in FIG. 5). In other examples, the second portion 133 may have a curved portion and a straight portion, and connect directly to the first portion 142. In other examples, the first portion 142 may have a straight portion and a curved portion and connect directly to a second portion 133. In other examples, the drivers side outer upper trailing arm 140 may angle downward or it may substantially go parallel to ground (as shown in FIG. 4) from frame 150 along first portion 142 and the second portion 133. The second portion 133 may angle outward towards the wheel hub 115 and attach to the wheel hub 115 frontward or mostly frontward, of the wheel hub 115 center axis and at an angle between 10 and 65 degrees clockwise from a center point of the wheel hub 115 and above a horizontal line 156 going through the center point of the wheel hub 115 and frontward of a vertical line 155 going through the center point of the wheel hub 115. In one example, the second portion 133 attaches to the wheel hub 45 degrees clockwise from center point of wheel hub 115 (vertical wheel hub line 155 and horizontal wheel hub line 156 intersection) and frontward of vertical wheel hub line 155 (and upward from horizontal line 156) at a radial distance of 3.5 inches. The second portion 133 may attach along an outer periphery of the wheel hub 115 as shown in FIG. 4. In other examples, the second portion 133 may connect to the wheel hub 115 at a location of 1 degree, 5 degrees, 10 degrees, or 20 degrees, 35 degrees, or 40 degrees or more, as indicated by angle 163 at a radial distance of 2 inches, 2.5 inches, 3 inches, 4 inches, 4.5 inches, 5 inches, 5.5 inches, or 6 inches or more.

FIG. 5 shows a partial detail view of a portion of a vehicle (rear wheel and trailing arms) in accordance with one example. FIG. 5 shows how the trailing arms are attached to inset wheel hub. In one example, the wheel hub is inset approximately ¾ of wheel width, or approximately 9 inches. Lower inward drivers side trailing arm 110 has a first portion 112 angled downward and inward (or substantially flat to ground at ride height), and a second portion 116 angled outwards (and flat or slightly downwards) and attached to wheel hub 115. Trailing arms 110 may have a third portion 116' that connects to first portion 112 and enters wheel space 162 and remains relatively level (in other examples, 116' or 116 may be angled upward or downward). In other examples, the first portion 112 may be perpendicular to frame 150 or the first portion 112 may angle outward. In some examples, the second portion 116 may be parallel to the ground or angle downward. In one example, the trailing arm 110 may have a lowest point outside of wheel (or lowest point may be inside wheel space 162) and rearward of rear axle 122, and in one example rearward of rear axle 122, providing extra clearance for rear axle 122 when wheel is lowered from ride height. An inset wheel hub 115 allows for a longer axle and therefore more wheel travel. In one example, to accommodate the longer axle from an inset wheel hub 115, inner lower trailing arm 110 angles downward from frame 150 until rearward of rear axle 122. The inner lower trailing arm 110 angles upward and outward to wheel hub 115 rearward of rear axle 122.

By way of example, as shown in FIG. 5, lower outward drivers side trailing arm 130 angles inward and downward from frame 150 attachment location and has a first portion 132, and a second portion 131, and is attached to wheel hub 115. In other examples, the first portion 132 may be perpendicular to frame 150 or in other examples, the first portion 132 may angle outward. The second portion 131 may be angled downward from first portion 132 along second portion 131 and attached to wheel hub 115 as shown in FIG. 5. In other examples, the second portion 131 can be parallel to ground or even angle upward. An inset wheel hub 115 allows for a longer rear axle 122 and therefore more wheel travel. In one example, to accommodate the longer rear axle 122 (from an inset wheel hub 115), outer lower trailing arm 130 is angled downward from frame 150 along the first portion 132 and the second portion 131 continues to angle downward to provide more maximum clearance.

By way of example, as shown in FIG. 5, upper inward drivers side trailing arm 120 has a first portion 114 angled inward and upward, and a second portion 118 angled outwards and attached to wheel hub 115. In other examples, the first portion 114 may be perpendicular to the frame 150 or it may angle outward. The second portion 118 may be attached to a third portion 118' and the second portion 118 and the third portion 118' may be substantially flat in wheel space 162 or may be angled upward or downward and attached to wheel hub 115 as shown in FIG. 5. The trailing arm 120 may have a high point outside of wheel (towards inside of vehicle) and rearward of rear axle 122, providing extra clearance for rear axle 122 when wheel is raised upward from ride height. In one example, to accommodate the longer axle from an inset wheel hub 115, inner upper trailing arm 120 angles upward from frame 150 until rearward of rear axle 122. The inner upper trailing arm 120 angles downward and outward to wheel hub 115 rearward of rear axle 122.

By way of example, as shown partially in FIG. 5, upper outward drivers side trailing arm 140 angles upward (or in some examples flat) from frame 150 attachment location and has a first portion 142 (shown in FIG. 4), and a second portion 133 connected to the first portion 142 via a third portion 133' and the second portion 133 is attached to wheel hub 115. In other examples, the first portion 142 may be perpendicular to frame 150 or in other examples, the first portion 142 may angle outward. The second portion 133 may be angled downward (or in some examples flat as shown in FIG. 5, or slightly upward) from first portion 142 along second portion 133 and attached to wheel hub 115 as shown in FIG. 5. The trailing arm 140 may have a highest point outside of wheel, and in one example in front of rear axle 122. In other examples, trailing arm 140 may rise along entire length up to wheel hub 115. An inset wheel hub 115 allows for a longer rear axle 122 and therefore more wheel travel. In one example, to accommodate the longer rear axle 122 (from an inset wheel hub 115), trailing arm 140 is angled downward from frame 150 along the first portion 142 and the second portion 133 continues to angle downward to wheel hub 115.

Figure 6:
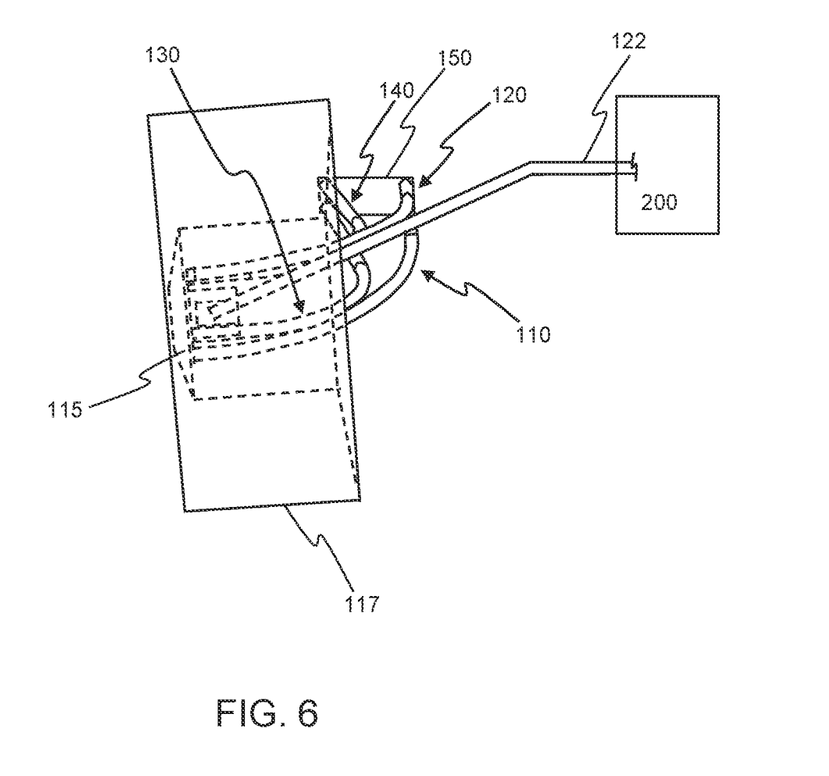
FIG. 6 is a partial rear view of a vehicle with trailing arms in accordance with an embodiment.

FIG. 6 shows, by way of example, a wheel in a lowered condition. FIG. 6 shows trailing arms attaching to a frame 150 frontward of rear axle, entering wheel space 162 frontwards of the rear axle, and attaching to the wheel hub 115 and clearing the rear axle 122 when the rear axle is rotated downwards approximately 27 degrees from where the rear axle connects to the engine cv joint 200 or measure from where the rear axle is level with the ground, when wheel hub is inset about 9 inches or approximately ¾ width of wheel.

The frame can be constructed in various ways, for example, U.S. Pat. Nos. 9,493,191 and 10,023,234 are incorporated by reference, and describe how an ATV frame can be made and useful with trailing arms described herein.

It is to be understood that the above reference arrangement are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be practical and useful embodiment(s) of the invention, it will be apparent to those of ordinary skill in the art that numerous modifications can be made without departing from the principles and concepts of the invention as set forth herein.

What is claimed is:

1. A vehicle comprising:
   a frame;
   any number of rear trailing arms;
   a rear wheel with a wheel hub space and a wheel hub, wherein the wheel hub is inset to the rear wheel inside of the wheel hub space, wherein the wheel hub has a wheel hub center axis; and
   wherein all of the any number of the rear trailing arms have a first portion attached to at least a portion of the frame frontward of the wheel hub center axis and a second portion attached to the wheel hub at connection points located between a first location and a second location on the hub, wherein the first location is defined as rearward of a vertical center line of the wheel hub center axis and above a horizontal center line of the wheel hub center axis and at an angle between 1 and 45 degrees counter clockwise from the vertical center line, and the second location as defined in a clockwise direction from the first location, as viewed from an interior side of the rear wheel, as rearward of the vertical center line and below the wheel hub horizontal center line and at an angle between 1 and 45 degrees clockwise from the vertical center line.

2. The vehicle of claim 1 wherein the rear wheel hub is inset to the wheel by 9 inches.

3. The vehicle of claim 1 wherein the vehicle further comprises a rear axle wherein the rear axle is connected to an engine component of the vehicle and the rear axle is aligned with the wheel hub center axis, and all of the any number of the rear trailing arms clear the rear axle when the rear wheel is raised or dropped up to 27 degrees.

4. The vehicle of claim 1 wherein any number of the rear trailing arms are attached to the frame substantially perpendicular relative to the frame.

5. The vehicle of claim 1, wherein all of the any number of the rear trailing arms are attached to the rear wheel hub, an attached to the frame substantially adjacent to each other.

\* \* \* \* \*